(No Model.)  5 Sheets—Sheet 1.
J. C. WALKER.
COMBINED ENGINE AND SUPERHEATER APPARATUS.
No. 531,488.  Patented Dec. 25, 1894.
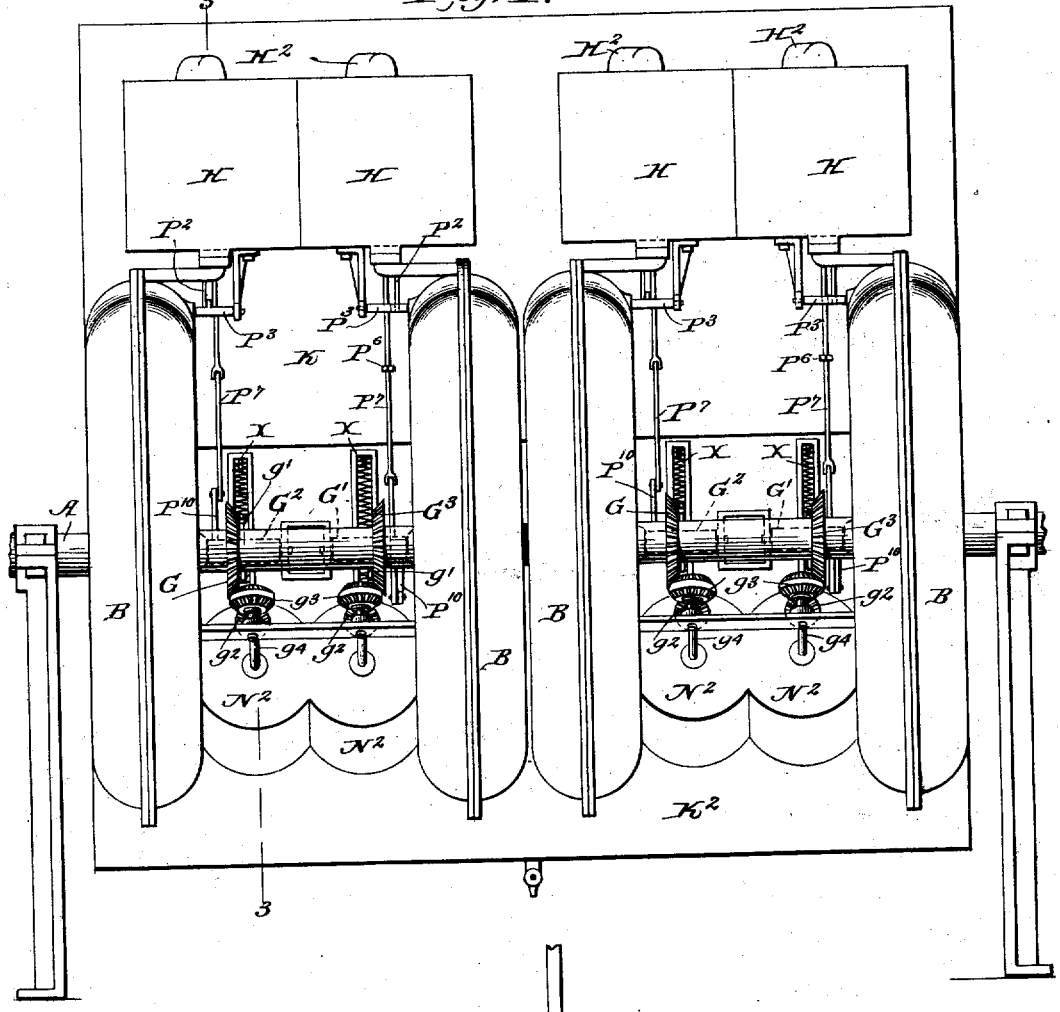
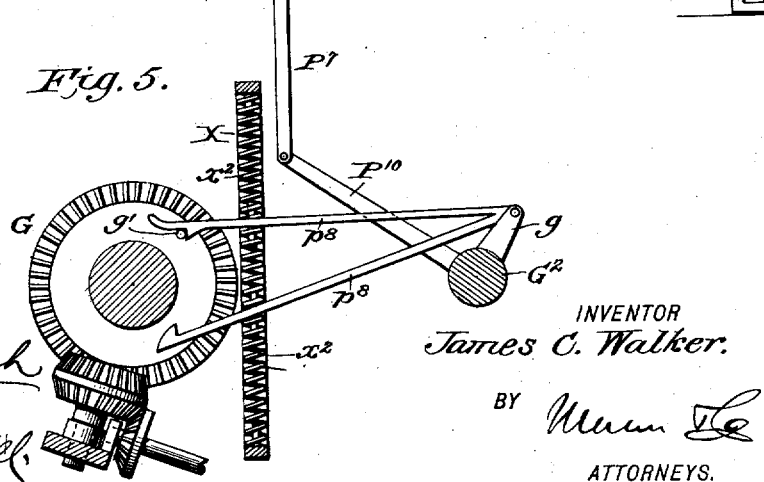
WITNESSES:
Fred G. Dieterich
U. D. Blondel
INVENTOR
James C. Walker.
BY
ATTORNEYS.

(No Model.) 5 Sheets—Sheet 2.
J. C. WALKER.
COMBINED ENGINE AND SUPERHEATER APPARATUS.
No. 531,488. Patented Dec. 25, 1894.
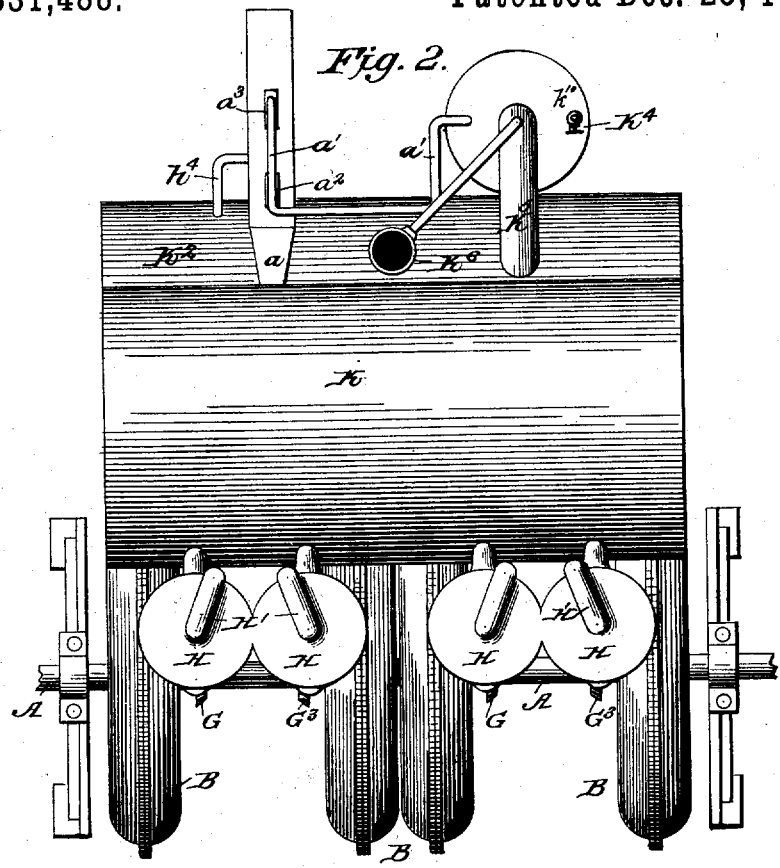
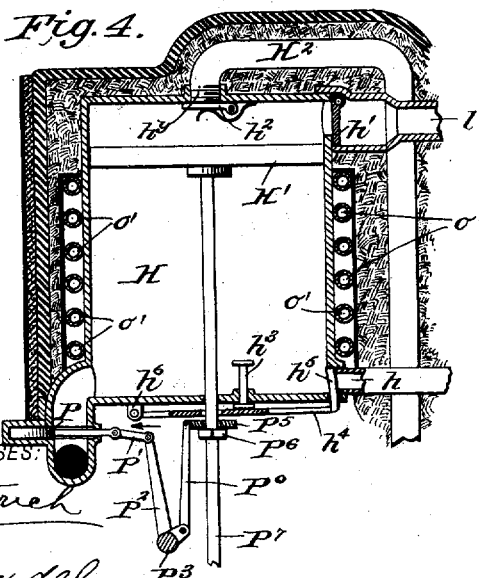
WITNESSES:
Fred G. Dieterich
M. D. Blondel
INVENTOR
James C. Walker.
BY Munn & Co.
ATTORNEYS.

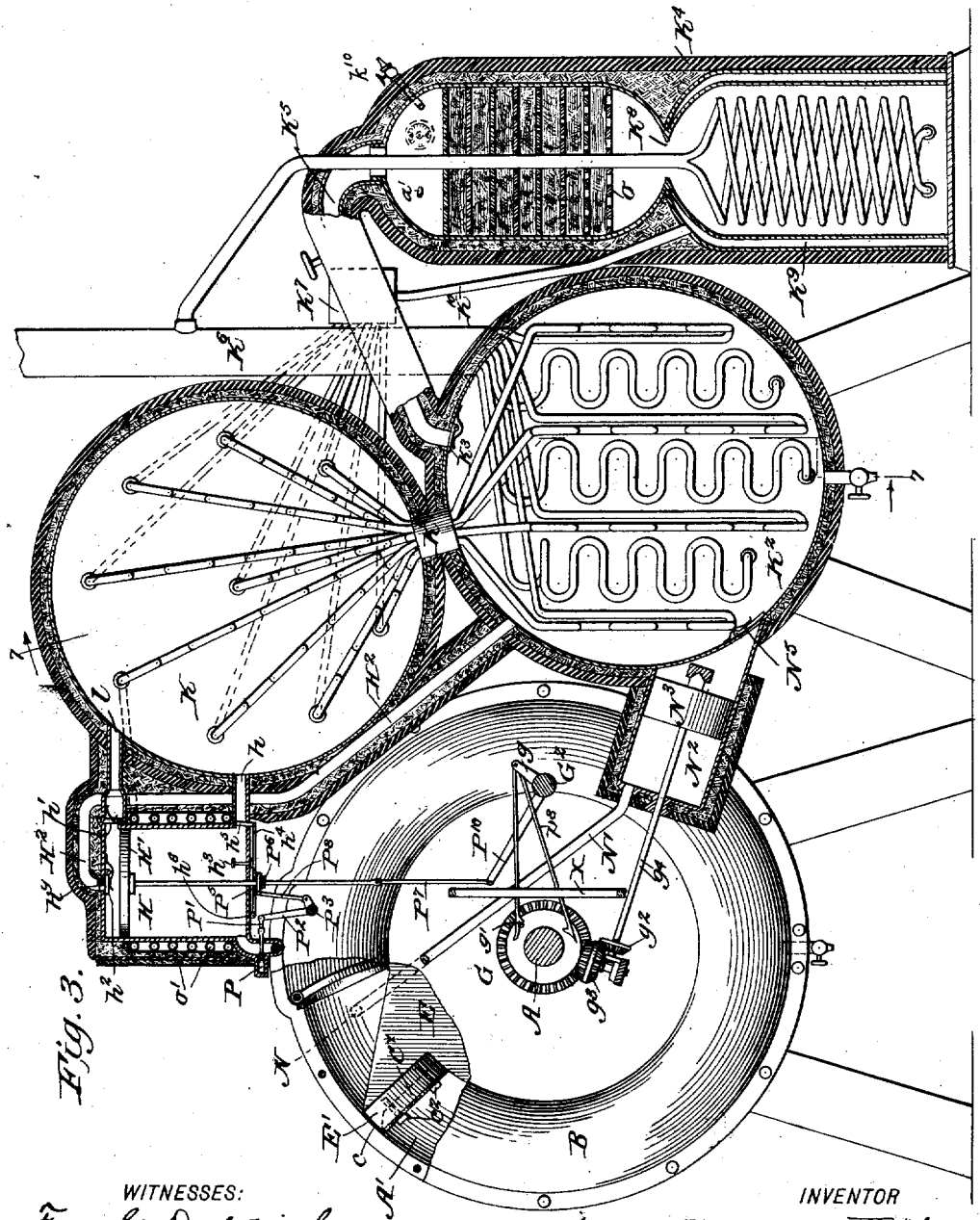

(No Model.) 5 Sheets—Sheet 4.
J. C. WALKER.
COMBINED ENGINE AND SUPERHEATER APPARATUS.
No. 531,488. Patented Dec. 25, 1894.
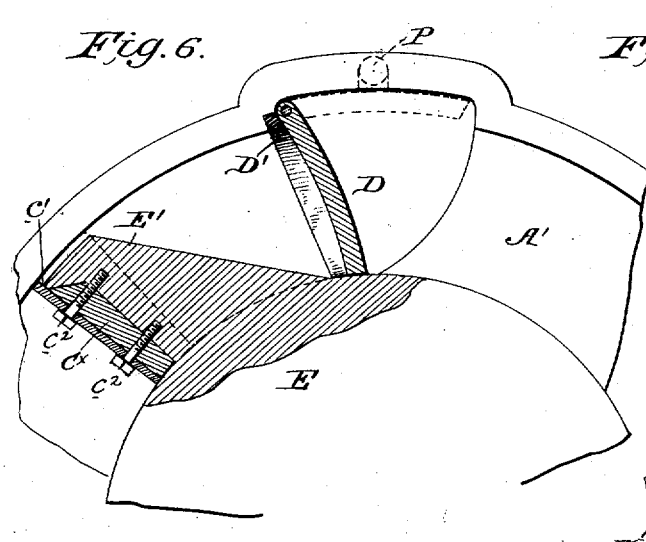
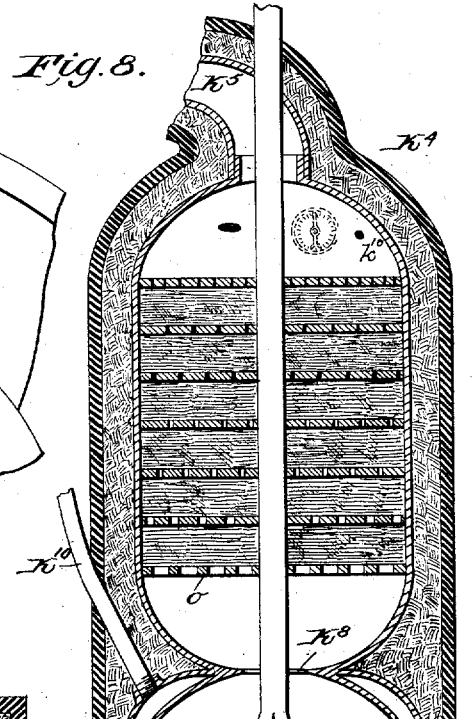
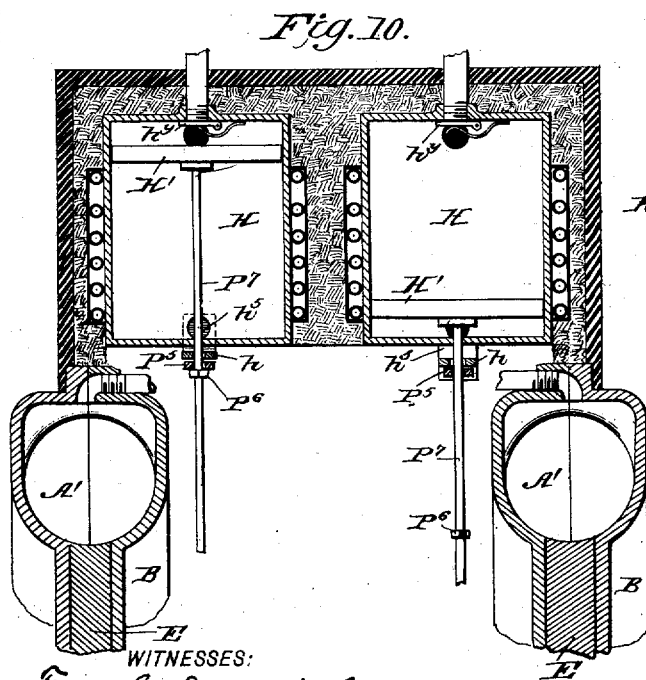
WITNESSES:
Fred G. Dieterich
M. D. Blondel
INVENTOR
James C. Walker.
BY
ATTORNEYS.

(No Model.)
J. C. WALKER.
COMBINED ENGINE AND SUPERHEATER APPARATUS.
No. 531,488. Patented Dec. 25, 1894.
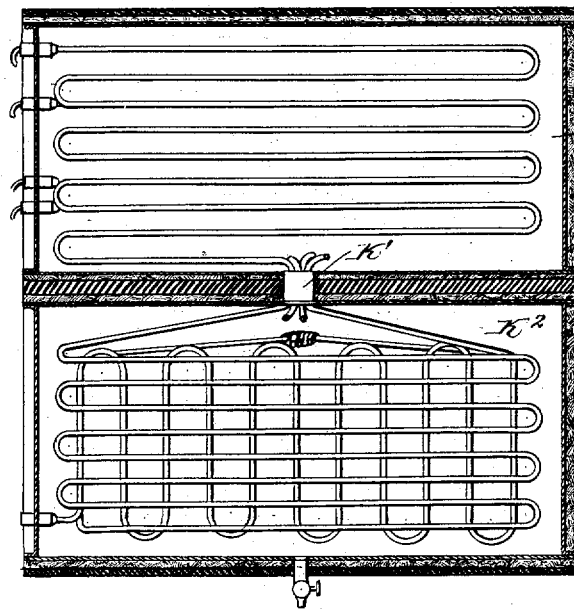
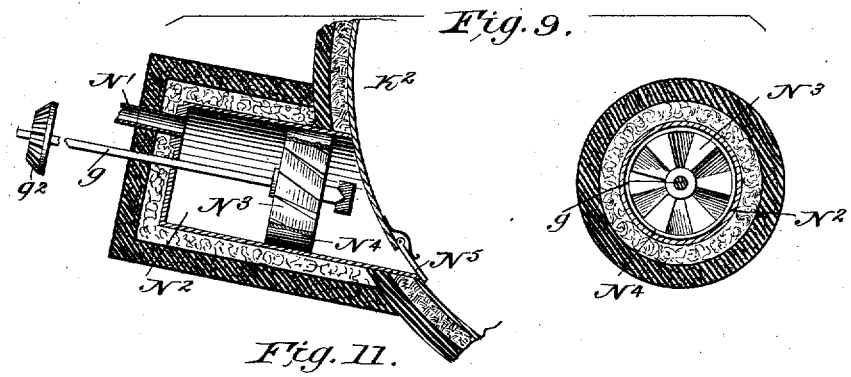
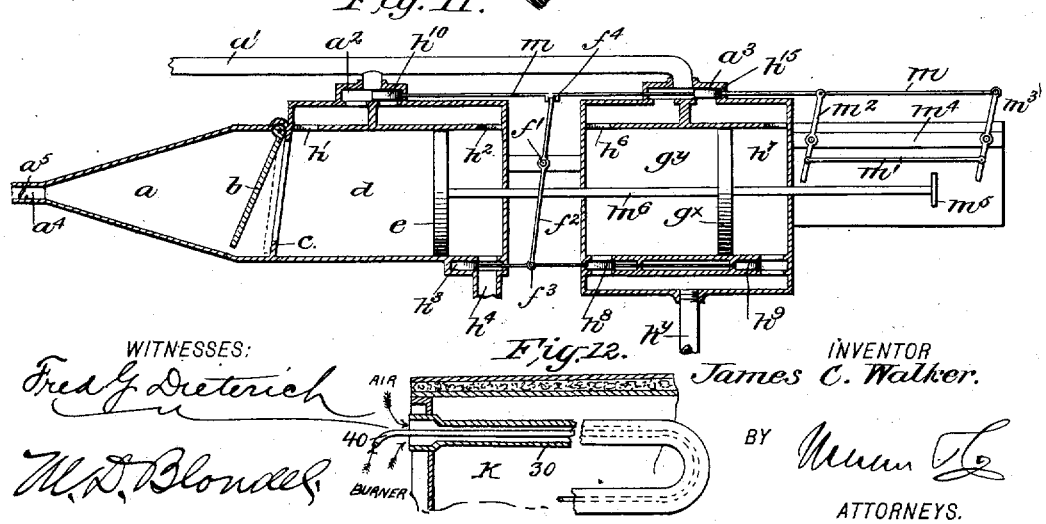

UNITED STATES PATENT OFFICE.

JAMES C. WALKER, OF WACO, TEXAS.

COMBINED ENGINE AND SUPERHEATER APPARATUS.

SPECIFICATION forming part of Letters Patent No. 531,488, dated December 25, 1894.

Application filed September 26, 1894. Serial No. 524,183. (No model.)

*To all whom it may concern:*

Be it known that I, JAMES C. WALKER, of Waco, in the county of McLennan and State of Texas, have invented a new and Improved Combined Engine and Superheater Apparatus, of which the following is a specification.

My invention is in the nature of a combined steam superheater apparatus and engine driven thereby, which in turn is utilized to automatically shift the steam feeding and cut off devices, and such invention primarily has for its object to provide a combined mechanism of this character which will effectively operate for its intended purposes.

It has also for its object to provide mechanism of this kind so arranged that but a minimum amount of force will be required to operate to move the piston to the extreme points of its reciprocal thrusts within the main cylinder or steam chest.

Furthermore it has for its object to provide a primary heating or steam producing means, so arranged as to sift the steam of all solid particles of water, and other mineral or vegetable matter, whereby to render it as near pure gas as possible and thereby keep it practically free from such solid particles of water or condensations.

It has also for its object to provide means for retaining the heat within the several steam holding compartments or reservoirs, whereby to prevent the same cooling by its expansion, and preserve and utilize, as it were, so far as possible, its superheated energy.

With other objects in view, which hereinafter will be made apparent by the detail description of the several parts or will be specifically set out, the invention consists in such novel arrangement and peculiar combination of parts, such as will be first described in detail and then be particularly pointed out in the appended claims, reference being had to the accompanying drawings, in which—

Figure 1 is an end elevation of my improvements showing the same arranged in connection with a compound rotary engine mechanism. Fig. 2 is a top plan view thereof. Fig. 3 is a longitudinal section on a somewhat enlarged scale, taken on the line 3—3 Fig. 1, the rotary engine steam chamber being broken away and partly shown in section to the more clearly illustrate the invention. Fig. 4 is a detail sectional view of one of the steam chests, the piston, and the valve operating devices. Fig. 5 is a detail side view of the shifting mechanism connected with the valve operating devices. Fig. 6 is an enlarged detail view of a portion of one the rotary engine piston heads, and the hinged abutment mechanism. Fig. 7 is a longitudinal section of the main steam reservoir and the superheater, taken practically on the line 7—7 in Fig. 3. Fig. 8 is an enlarged sectional elevation of the primary heater, hereinafter referred to. Fig. 9 is a detail view illustrating the exhaust steam rotary pump mechanism. Fig. 10 is a vertical section of a pair of the engine cylinders and the steam chests, taken practically on the line 10 in Fig. 3. Fig. 11 is a longitudinal section of such pump or injecting mechanism. Fig. 12 is a detail view hereinafter particularly referred to.

In the practical construction and arrangement of my improved steam generating and superheating mechanism, I prefer to combine the same in use with rotary steam engine devices, as such arrangement I deem a preferred one, and for this reason I have shown the same combined with a compound rotary engine, having four cylinders and independent supply chests, which cylinders in their general relation may be arranged substantially as shown in my Patent No. 515,631, but I desire it understood that the steam generating and superheating devices may be used in connection with reciprocating engines.

Referring now to the drawings by letters and numerals of reference, A, indicates the main axle; B, the cylinders; E, the piston disks, which have each a radial piston $E'$ which works in the annular steam chamber $A'$ of the cylinders as shown most clearly in Figs. 3 and 4, from which it will be seen such piston comprises the extension proper of disk E, which does not quite touch the sides of the cylinders, whereby to leave a space surrounding its contact portions, over which is fitted a stiff asbestos cloth or other covering $c'$ to make a tight joint. Such extension has a groove in its rear face in which fits a tooth member $C^\times$ of disk E which extends slightly beyond the peripheral edge of the extension $E'$ it being held thereon by screws $c^2$ $c^2$.

D indicates one of the abutment valves, which is hinged at the top and rests when down against the abutment D', lined with packing to lessen the shock and deaden the sound, and such valve it will be noticed, when the piston engages it, is adapted to swing up in a recess in the perimeter of the steam chamber provided therefor, as indicated in dotted lines, into which the inlet port of the connecting steam chamber discharges.

Between each pair of steam cylinders B are held two rock shafts $G'$ and $G^2$, which shafts are adapted to be rocked alternately in reverse direction by means of suitably arranged trip mechanism operated by disks G and $G^3$ fixedly secured on the main axle as shown most clearly in Fig. 1. As shown, such trip mechanism comprises studs or pivots $g'$ and $g'$ projected laterally from the disks G and $G^3$ which are adapted to successively engage a pair of lever arms $p^8\ p^9$ which at one end are pivotally connected to a crank portion $g$ and $g$, on the rock shafts $G'$ and $G^2$, while their opposite or free ends are projected over the side of the disks G and $G^3$, and provided with shouldered or barbed terminals so arranged that the studs $g'$ and $g'$ will, as they are rotated, engage such barbs and serve to alternately operate the cranks $g$, to rock the shafts $G'$ and $G^2$ in reverse directions, the front ends of such levers being passed through a sash or guide X, in which cushion springs $x^2$ are held which serve to hold such levers to their proper position to be engaged by the proper studs $g'$ and $g'$.

By referring to Fig. 1 it will be seen, two rock shafts $G'$ and $G^2$ are employed, one for each engine cylinder, and trip mechanism to operate each shaft, and each shaft has a crank arm $P^{10}$ projected in substantially at right angles to the crank member $g$. It should be here stated that in the present arrangement of the rotary engine cylinders, the abutments are all disposed at the upper end as shown in Fig. 3, but the pistons of the cylinders are placed at right angles to each other. By this arrangement the pistons will be at the top to receive the impact force of live steam under a full head at each quarter turn of main axle A. Each of the cylinders B has connected therewith an independent steam chamber or chest H, which have their inlet ports arranged substantially in the manner illustrated most clearly in Fig. 4, and each of such chambers H, has a set of valve devices, which are adapted to be operated simultaneously in alternate directions.

Referring again to Fig. 3, it will be noticed the arm $P^{10}$ is pivotally joined to the lower end of a plunger rod $P^7$, the upper end of which extends into the chamber H and is secured to the piston H'.

$P^6$ indicates a nut, held vertically adjustable on the rod $P^7$, which is adapted to engage (in a manner hereinafter more fully described) the member $P^5$, of an angular lever device pivoted at $P^3$, the arm $P^2$ of which has a hinged member P' to which is pivotally connected the shank of the inlet valve P. The member $P^5$ is fixedly joined with the member $P^0$ and such member $P^5$ has an aperture through which the rod $P^7$ passes.

$h^4$ indicates a lever having a hole through which rod $P^7$ passes, which is pivoted at $h^6$ on the bottom of the chamber H, while its free end has a valve $h^5$ which is adapted to be forced over a port $h$ extending from a superheater K.

$H^2$ indicates a steam passage extending from a main steam reservoir $K^2$ upward to discharge at $h^y$ into the top of the chamber H, and over such port $h^y$ operates a spring valve $h^2$.

The parts so far as described, in practice, are so arranged relatively, that so soon as the piston in chamber B passes the wing valve D, the nut $P^6$ is raised, which presses on the arm $P^5$, and swings the angle lever on the top pivot $P^3$ in the direction indicated by the arrow and thereby opens valve P, and permits live superheated steam drawn in through port $h$ (the valve $h^5$ being at this time held closed) to pass out through port P, (as piston H' starts down) into the engine cylinder, and when piston H' reaches the end of its downward stroke it presses down a small rod $h^3$, which passes steam tight through the lower head of the chamber, and bears against the lever $h^4$, and as such lever bears on the lever member $P^5$, it follows, such downward pressure will automatically shift the valves P and $h^5$ and reverse the action of piston H'.

$K^4$ indicates what I term the primary boiler, which is arranged upright, and in practice is of comparatively small dimensions, and is heated by means of oil burners and coiled copper pipes arranged substantially as shown, to give the quickest and best result. This boiler comprises practically a base or heating compartment, in which the heating pipes are coiled, and an upper screening or separating chamber, such chambers being separated by a contracted portion $K^8$ which has a central aperture or throat through which the fire tubes pass, and which extend up through the top of the heater and enter the stack pipe $K^6$ as shown.

From the throat $K^8$ the screening chamber or steam space extends up the full diameter of the boiler, and at some distance above such throat commences a series of perforated plates, extending the full width of the chamber. In the first plate $o$ the holes are comparatively large, say one-half an inch, the next plate has holes about one-fourth of an inch and the succeeding plates slits or holes successively diminishing in size, such slits and holes being arranged alternately or staggered, to make the steam, (which in its wet state accumulates in the space below the lower plate and above the water line) pass as many sharp edges by zig-zag routes as possible. Above the several plates is disposed a series of asbestos cloth sifting screens, the first of which is coarse and the succeeding ones successively finer, with open space between them, as also open space between the metal sifters.

The object in providing the several plates and cloth sifters, is to sift the steam of the solid particles of water and other mineral or vegetable matter, and thereby render the same as nearly pure gas as possible.

From $K^4$ the steam passes in practice a little above 225° Fahrenheit, through a pipe $K^5$, and the valved port $K^3$, into the main steam reservoir $K^2$. This reservoir is also provided with a series of oil burners which serve to keep the steam within the reservoir up to the standard or desired temperature, say 225° Fahrenheit, which burners may be of any preferred construction and arrangement, but are preferably kept in operation by heated air which passes from a collecting drum $K^7$ connected by pipe $K^{10}$ with an annular casing $K^9$ of chamber $K^4$ which surrounds the lower or heat portion of the primary boiler.

The several fire or heating tubes in $K^2$ extend from end to end in a coil or sinuous course, so as to provide the greatest friction and the largest heating area possible, so that when they reach the escape outlet or stack pipe $K^6$ as shown all the heat down to, say 225° Fahrenheit, will have been extracted.

K indicates the superheater which is provided with oil burners and copper tubes sufficient to keep the temperature of the steam at the desired degree, say 425° Fahrenheit. The tubes run through the heater from end to end in a coil or sinuous like form, and may be kept in operation by connecting them with the heated air drum and annular heating chamber of the primary boiler above mentioned or may be fired independantly thereof if desired, such tubes being in practice so arranged that when they reach the exit $K'$ all the heat above the desired degree shall have been extracted.

The superheater tubes are continued in a reduced number from the exit of $K'$ and passed through the reservoir $K^2$ and out into the stack pipe $K^6$, such extensions being also arranged in coil or zig-zag manner, whereby all the heat above 225° Fahrenheit will be extracted before they enter the exit pipe $K^6$.

By running the fire tubes through the reservoir and superheater in the manner stated and shown and by cleaning the steam as it were, before it passes from the primary heater there will be practically no condensation or wet steam so long as the temperature is kept above 212° Fahrenheit, say 225° Fahrenheit.

Referring now again to Fig. 3, it will be seen the superheater has also a port $l$ which enters the upper end of the chamber H and is normally held closed by a pressure valve $h'$, through which the compressed steam passes into the superheater as hereinafter more fully explained.

Assuming now the piston to be up to the position shown in Fig. 3, at this time the trip mechanism will serve to rock the shaft $G^2$ and force the piston slightly upward, or to its final up thrust. This movement causes the nut $P^6$ to engage the member $P^5$ of the inlet valve shifting lever mechanism, which causes the said inlet valve to open and closes the valve $h^5$ over the port $h$, by contact with the lever $h^4$. The volume of the superheated steam held under the piston $H'$ then passes into the cylinder B, and as the pressure is thus decreased below the piston, steam from the reservoir $K^2$ at 225° Fahrenheit, will pass up the pipe $H^2$ and force down the valve $h^2$ and enter the chamber against such piston $H'$, the valve $h'$ being at this time held closed by the 425° Fahrenheit pressure in the superheater. Now as the said piston travels to the final point of its down stroke it engages the tripper $h^3$ and shifts the valves so the outlet valve P will be closed and the valve $h^5$ opened. Steam under 425° Fahrenheit will then pass through port $h$ under the piston and force it up until the 225° Fahrenheit steam held above it by compression (the valve $h^2$ being closed by the compression) balances the pressure of steam from the superheater under it. When the two forces are equal it requires but a little upward pressure from the plunger rod $P^7$ to complete the stroke and force the compressed steam from the upper portions of the cylinder H into the superheater through the valve $h'$ and pipe $l$. When the piston thus reaches the highest point, the valve $h^5$ is closed and valve P opened through the action of the nut $P^6$ on the levers $P^5$ and $h^4$. The superheated steam then rushes through the outlet port into the cylinder $B'$. At this instant the rock shaft $G^2$ through the action of the lever $P^{10}$, starts piston $H'$ down— (the valve $h'$ being closed). Steam from reservoir $K^2$ through pipe $H^2$ opens valve $h^2$ and to the extent of its pressure—say 225° Fahrenheit—forces such piston $H'$ to follow the retreating steam and to that extent aids the piston rod $P^7$ to complete the downward stroke. By this arrangement of parts it is obvious, but little force will be required of the revolving piston in the cylinder B through the rock-shaft $G^2$ and tripping devices to operate the piston $H'$. The same action takes place successively in each of the chambers H and cylinders B at each quarter turn of the main axle A.

The exhaust ports of all the cylinders B are arranged as indicated at N in Fig. 3, and such ports are connected by pipes $N'$ with cylinders $N^2$, in each of which is what may be termed a rotary steam pump, which comprises a turbine like wheel $N^3$ which has a hub portion journaled in a cone bearing of the cylinder as shown, which hub extends the entire length of the wheel $N^3$, and has projected therefrom radially a series of wide vanes, disposed in a spiral form. These vanes at the outer edges are connected to an outer rim $N^4$ which fits close (but not in contact) to the inside of the cylinder $N^2$.

The vanes are preferably set at a small angle at the upper part or front edge and this angle is gradually increased toward the lower end, they being also gradually curved upward between the hub and the outer edge from the front toward the lower end, so as to concentrate the draft to about the center of vane at its exit.

The cylinder $N^2$ connects through a valved port $N^5$ with the reservoir $K^2$ as shown clearly in Fig. 3.

By providing a pump mechanism of the character described, the same will serve to prevent any regurgitation of steam about the center of the wheel and by increased revolutions it will produce almost a perfect vacuum in the front portion of the cylinder. The wheel $N^3$ is run by the shaft $g^4$ and gearing $g^2 \ g^3$, connected with and driven by the disks $G' \ G^3$ as shown. The object in connecting a pumping mechanism to the cylinder and reservoir $K^2$, is to draw the exhaust steam (say it is worked down to 225° Fahrenheit) through the port N, and pipe $N'$ and force it back into the reservoir $K^2$ through the valve $N^5$. It is manifest that in practice I may modify the detailed arrangement of the pump devices and the gear mechanism for operating the same without departing from the broad principle of my invention. It should be however stated the wheel $N^3$ may be so geared and regulated, that it will not only force the exhaust steam into the reservoir, but also create a vacuum in the circular cylinder in rear of the piston $E'$. It will thus be seen, it will require but little force to work the pump, because the exhaust steam is of substantially the same temperature as the steam in the reservoir $K^2$. Hence the pressures are equal, and as one charge is taken from the reservoirs $K^2$ by the cylinder H and forced into the superheater, the rotary pump supplies its place in the reservoirs with the exhaust steam, thereby making it possible by these means properly made and regulated, that an equilibrium of steam between the reservoir and superheater be kept constant and the use and reuse of the same steam becomes practicable, thereby utilizing as it were, only the extra heat of the superheater for practical work.

The several cylinders H are inclosed in an outer casing and each cylinder is surrounded with fire tubes $o' \ o'$ from additional burners, which are encompassed by metallic sheathing and this inclosed by asbestos, which in turn is covered by felt, the whole again being inclosed with asbestos and felt, incased in an exterior metallic casing. The tubes $o' \ o'$ discharge into the tubes which enter the superheater K. The object in incasing and heating the chambers H in the manner stated is to retain all the heat within and prevent the cooling of steam by its expansion, in its entrance within and exit from the said chambers H, and thus preserve and utilize its superheated energy.

While the equilibrium of steam in the superheater and the reservoir will under ordinary circumstances be constantly kept uniform by the means above described, yet for safety and in case of accidents, I provide a supplemental mechanism in the nature of a steam pump which serves to inject the steam into the superheater and reservoir, when set in operation, in the manner presently set out.

Referring now more particularly, to Fig. 11 which shows the relative positions of the pump and the reservoir and superheater, $d$ and $g^y$ represent two cylinders arranged in the same alignment, and of the same dimensions, the cylinder $d$ terminating at the outer end in a nozzle $a$ the end $a^4$ of which enters the superheater K, through the automatic pressure valve $a^5$.

$b$ indicates a valve hinged at the top which when swung down rests on an abutment $c$ as shown by dotted lines in Fig. 11.

$e$ is the piston which plays in the cylinder $d$ while $g^x$ indicates the piston in cylinder $g^y$ both of such pistons being fixedly connected to the same shaft $m^6$ which passes through the head of the cylinder and carries on its outer end a cross head $m^5$.

$a^2 \ a^3$ are steam valve boxes fed by the pipe $a'$ from the primary boiler.

$h^{10}$ is a slide valve in box $a^2$.

$h^{15}$ is the same for box $a^3$, such valves being connected by the rod $m$, which extends to and is worked by the cross head $m^5$ by means of the levers $m'$, $m^2$ and $m^3$, of which $m'$ is parallel with $m$, and connected at its ends with $m^2 \ m^3$ by a hinge joint. $m^2 \ m^3$ are also connected by a hinge with $m$. $m^4$ is a bar or support on which $m^2 \ m^3$ are pivoted.

Between the cylinders is arranged a lever $f^2$ pivoted at $f'$ and pivotally joined at $f^3$ with the connecting rods of the slide valves $h^3$, $h^8$ and $h^9$, and its opposite or free end enters a socket $f^4$ on the rod $m$.

Assuming now that the steam is raised, say to 300° Fahrenheit in the primary boiler, and it be turned on through pipe $a'$: and supposing the ports $h' \ h^6$ being open, steam would force both pistons down toward the cross head $m^5$, and when the pistons reached the end of the cylinders the cross head would come in contact with the projecting end of the lever $m^3$ and move the connecting rod $m$ in the opposite direction. This would close valves $h'$ and $h^6$ and open valves $h^2$ and $h^7$, and at such time the steam will force the pistons back, and when such pistons reach the end of the stroke, the cross head will come in contact with the projecting end of the lever $m^2$ and force the rod $m$ in an opposite direction, and the reverse movement of the above stated parts will be produced. It will be also noticed, in the first downward movement of the rod $m$ the socket $f^4$ will carry the end of the lever $f^2$ with it and this would move the hinged end $f^3$ in the opposite direction and so open valve $h^3$, close valve $h^8$ and open valve $h^9$. Supposing now both pistons as being near the top and the cylinders below the pistons receiving steam, when the pistons reached the upper end of their stroke, they would open valve $h'$ and close valve $h^2$ and open $h^6$ and close $h^7$. On the downward stroke the steam below the piston $e$ would be forced out through pipe $h^4$ into reservoir $K^2$, while by the same movement valve $h^6$ would open and $h^7$ close, and the steam below piston $g^x$ escape into open air through valve $h^9$ and the escape pipe $h^y$. When the pistons reach the lower end of their stroke, the movement of all the valves would be reversed and the upward movement of the pistons would force the steam above the piston $e$ in cylinder $d$ through valve $b$ and through the nozzle $a^4$ and valve $a^5$ into the superheater, after which the valve $a^5$ would close and valve $b$ would be forced back on its abutment and prevent the return of steam from the nozzle end, the steam in cylinder $g^y$ at this time being lost.

It will be obvious that by forming the cylinder $d$ with a nozzle like discharge, the exit force of steam is materially increased, and owing to the peculiar arrangement of the several parts no steam in such cylinder $d$ is lost, as the up stroke forces the steam in the upper part of the cylinder into the superheater, while the down stroke forces the steam below the piston into the reservoir.

In practice the reservoir and superheater are inclosed with asbestos and felt as also the pipes and the pump last described. The rotary engine cylinders are also inclosed by a casing covered by asbestos and felt, and an outer metallic casing as shown in Fig. 1. Pipes may also at convenient points, be introduced into the reservoir, superheater and engine, leading to a hot water reservoir from which the hot water may be injected into the primary boiler, whenever necessary.

From the foregoing description taken in the connection with the drawings, the general operation of the several parts may be stated as follows:

To start the apparatus the burners in the primary boiler and in the reservoir are ignited, dry steam is produced in the primary boiler, and when the gage indicates say 300° Fahrenheit the pipe leading from the reservoir $K^2$ is opened in order that the air of such reservoir $K^2$ and water of condensation resulting from the cold surface of such reservoir may escape. When the reservoir is full of steam at a constant temperature—say 300° Fahrenheit—the burners are ignited in the superheater and its hot water pipe is opened for escape of air. Steam is then turned in from the reservoir $K^2$, and when the temperature becomes constant at the desired degree (say 425° Fahrenheit), the engine is set in motion. Then commences the use and reuse of the same steam. It should be stated however that at the start, the gas and hot air escape valve at the top of the boiler $K^4$ are set to remain open until all the water in the boiler has passed the ebullition point and all the air and gases held in solution by the water has been expelled therefrom and passed out the escape valve, $k^{10}$, and having then nothing but pure water left in the boiler the escape valve is closed and the heat increased. The amount of steam let into the chamber H and from thence into the cylinders B B may be regulated by lengthening or shortening the crank portion $g$ on rock shaft G' and raising or lowering the nut $P^6$ on the rod $P^7$ and varying loads may be met by cutting in or out cylinders on the main shaft A.

The oil burners or heating coils may be of any ordinary construction such for instance as shown in detail in Fig. 12, in which the heating or air tube 30 is shown in communication with the atmosphere.

40 indicates the vapor or jet pipe which passes centrally through the pipe 30.

It is manifest that after the fire pipes are once ignited air will be drawn into the outer or air pipes. When, however the pipes are coiled a large number of times in the supplemental or superheating chambers, it may be necessary to connect an air blast means with air tubes to maintain a proper circulation of air therein.

Having thus described my invention, what I claim, and desire to secure by Letters Patent, is—

1. An improved steam operated motor, comprising an engine, a supplemental superheated steam chamber connected with the valved inlet port of the engine, a main steam supply, a reservoir connected therewith, a super-heater, said heater and reservoir having valved discharge ports opening into the supplemental chamber, operating mechanism for such valves and the engine inlet valve, a piston operating in the supplemental chamber, connected to such mechanism, and tripping devices connected to the piston and the engine drive shaft, arranged to lift the piston to its final up thrust, to operate the valve mechanism substantially in the manner hereinbefore described.

2. In a combined mechanism as described, in combination an engine having a valved inlet port, a supplemental superheated steam chamber connected with the said inlet port, a reciprocating piston operating therein, a steam reservoir, a superheater holding steam under greater pressure than the reservoir, said heater having a valved port opening into the said chamber under the piston, the reservoir having a valved port opening on top of such piston, and mechanism for shifting the valves of the several ports in the said chamber, operated by the piston as it reaches its final up thrust, and tripping devices operated by the engine shaft adapted to raise such piston, when the pressure on the opposite sides thereof is equalized, as set forth.

3. In a combined mechanism as described, the combination with the engine the exhaust thereof, the supplemental steam chamber, the steam reservoirs and the valve shifting devices, substantially as described, of a rotary pumping or analogous mechanism connected with and operated by the engine shaft, held to discharge into one of the reservoirs, and a pipe connecting such mechanism and the exhaust of the engine all arranged substantially as shown and for the purposes set forth.

4. In a mechanism as described, in combination a steam generating boiler, a reservoir, connected therewith, a superheater a supplemental superheated steam chamber, valved ports opening therein from the reservoir and superheater, an engine having a valve inlet opening into the supplemental chamber, the valve shifting mechanism, a piston operating in the supplemental chamber arranged to operate the shifting mechanism, and a supplemental or steam injector means, having discharges projected into the reservoir and the superheater. said means having alternately operating pistons and valve shifting devices, and a feed pipe connected with the main boiler all arranged substantially as shown and described.

5. In a steam generating means, as described, a primary boiler, having a heat retaining jacket, an upper, and a lower chamber, connected by a reduced or throat portion, the upper chamber having steam purifying means located therein, and a steam outlet, oil burners held in the lower chamber and projected up through the upper chamber through the top thereof, and a gas or air outlet in such upper chamber all substantially as and for the purposes shown and described.

6. In a mechanism as described, the combination with the engine, the steam feed chamber, the reservoir having a stack pipe and superheater the valved inlet ports from the reservoir and heater and the chamber to the engine the piston operating in the chamber and the valve shifting mechanism operated by the movement of the piston, of the series of oil burners and tubes therefor projected into the heater and the reservoir, held to circulate therein, and then pass out into the stack pipe, all arranged substantially as shown and for the purposes specified.

7. An improved steam motor comprising a rotary engine, a supplemental superheated steam chamber connected therewith having a valved feed port discharging into the piston chamber of the engine, a steam supply pipe, having a feed pipe opening into the top of the supplemental chamber, and provided with an outwardly opening valve, a superheater having ports $h$ and $l$ and opening respectively at the bottom and top into the said supplemental chamber, a compound valve mechanism operating to alternately close the inlet port to the engine piston chamber and the port $h$ a piston operating in the supplemental chamber, having a trip adapted to engage the compound valve mechanism and shift it as it reaches its final reciprocal thrusts, and means operated by the engine drive shaft for intermittently operating the piston independent of its steam force action as specified.

8. In a mechanism as described the combination with the engine proper, the reservoir $K^2$ and superheater K arranged to hold steam under different pressures, and a pump cylinder connected with the reservoir having a port opening therein normally closed by a valve held closed by the pressure in the reservoir, of the supplemental chamber H, the piston H′ the ports $l$ $h$, $H^2$ and P and the valves P, $h$, $h'$, and $h^2$, the tripping mechanism for such valves, a pipe connecting the exhaust of the engine with the aforesaid pump cylinder, a rotary turbine like force pump, operating such cylinder to draw the exhaust from the engine and gear mechanism operated by the engine drive shaft arranged to operate such force pump, all substantially as shown and for the purposes described.

9. In a steam motor, the combination with the engine cylinder, the rotary piston, the abutment and the inlet and exhaust ports arranged substantially as shown, of the chamber H, the steam supply ports $h$ and $h'$, the piston H′, having its rod $P^7$ provided with a stop $P^6$ the pivoted valve mechanism, having a valve P operating over the inlet of the cylinder and having a member fitted about the rod $P^7$ the hinged member $h^4$ fitted about the rod $P^7$ having a valve operating over the port $h$ and the tripper $h^3$ all arranged as shown and for the purposes described.

10. In a mechanism described, the combination with the engine, the reservoir $K^2$, the superheater K, having oil burners held therein, the chamber H, piston H′ the inlet and discharge ports opening into such chamber and the valve shifting mechanism for such ports arranged substantially as shown, of oil burners coiled about the chamber H having their discharge ends connected with fire tubes in the superheater, and a heat retaining casing surrounding the said coils as set forth.

11. The combination with the engine shaft a pair or pairs of engine cylinders, having abutments arranged at the same points, the pistons operating in such cylinders, the pistons being projected in opposite directions to each other, the steam chamber H connected with such cylinders, the piston and the steam feed ports and valves therefor arranged substantially as described, of the rock shafts G′ and $G^2$, means connected with the engine shaft for intermittently rocking each shaft G′ and $G^3$, crank members $P^{10}$ projected from the shafts G′ and $G^2$ in opposite directions, the said members being connected with the ends of the piston rods $P^7$, and shifting devices connected with the valves of the steam ports, arranged to be operated in alternate directions by the alternate movements of the piston rods $P^7$ as and for the purposes specified.

12. In a mechanism as described, the combination with the primary boiler having a supplemental heat collecting chamber, the reservoir $K^2$, and superheater, the oil burners projected therein, the tubes surrounding the burners and connected with the supplemental heat collecting chamber of the primary boiler, all substantially as shown and described.

13. The combination with the primary boiler, the reservoir and the superheater, of the combined pump and injector devices connecting the primary boiler and reservoir and superheater, comprising a double cylinder, a single piston rod having pistons, one for each cylinder, an inlet from the boiler opening into each cylinder alternately operating shifting valves for such inlets, an atmosphere outlet opening into the opposite ends of the outermost cylinder, a discharge outlet opening from the outer end of the innermost cylinder into the reservoir $K^2$, alternately operating shifting valves therefor, said inner cylinder having a discharge nozzle projected into the superheater, and a back pressure valve and the tripping devices connected with the valve mechanism arranged to be operated by the reverse movements of the piston as set forth.

14. An improved steam generator and motor comprising a primary boiler, a reservoir having heating means to hold the steam to a predetermined pressure, a superheater adapted to hold the steam at a greater pressure than the reservoir, a steam chamber, having a valved inlet port at the upper end, connected with the reservoir, and a second outlet at the top having a back pressure valve, communicating with the superheater, and an inlet port at the bottom opening into the superheater, a valve device movable over such lower port, the engine cylinder having an inlet port opening into the steam chamber H having a shifting valve, the piston operating in the said chamber, having its rod projected, and connected with the valves for the lower ports in such a chamber, and a shifting device connected with the engine shaft and the piston rod arranged to intermittently lift the piston, all arranged substantially as shown and described.

JAMES C. WALKER.

Witnesses:
JAMES G. FISCHER,
D. M. LAFFITTE.